(12) United States Patent
Moon et al.

(10) Patent No.: US 7,359,533 B2
(45) Date of Patent: Apr. 15, 2008

(54) METHOD AND APPARATUS FOR IDENTIFYING A FINGERPRINT

(75) Inventors: Dae Sung Moon, Daejeon (KR); Min Kim, Seoul (KR); Sung Bum Pan, Daejeon (KR); Youngwha Chung, Daejeon (KR); Kichul Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 782 days.

(21) Appl. No.: 10/830,212

(22) Filed: Apr. 21, 2004

(65) Prior Publication Data

US 2005/0105783 A1 May 19, 2005

(30) Foreign Application Priority Data

Nov. 14, 2003 (KR) ............... 10-2003-0080542

(51) Int. Cl.
*G06K 9/00* (2006.01)
(52) U.S. Cl. .................................... 382/124
(58) Field of Classification Search ............. None
See application file for complete search history.

(56) References Cited

U.S. PATENT DOCUMENTS

| 5,613,014 A | * | 3/1997 | Eshera | ............... | 382/124 |
| 7,006,673 B2 | * | 2/2006 | Hamid | ............... | 382/124 |

FOREIGN PATENT DOCUMENTS

| KR | 1020020072618 | 9/2002 |

(Continued)

OTHER PUBLICATIONS

"A Hardware Implementation for Real-Time GH", M. Kim, et al., Biometrics Technology Research Team, Proceedings of the 19th KIPS Spring Conf.

*Primary Examiner*—Matthew C. Bella
*Assistant Examiner*—Alex Liew
(74) *Attorney, Agent, or Firm*—Blakely, Sokoloff, Taylor & Zafman LLP

(57) ABSTRACT

Provided are a method and apparatus for identifying a fingerprint. The method uses minutiae points of the fingerprint and includes (a) enrolling a fingerprint of a first user in a first database by extracting n minutiae points from a fingerprint image of the first user; selecting one of the n minutiae points as a reference point; rotating the other minutiae points by a predetermined angle with respect to the reference point; generating a first user table containing information regarding the first user's fingerprint based on geometrical changes of the other minutiae points which are obtained by the rotation; and storing the first user table in the first database; and (b) identifying a fingerprint of a second user by extracting m minutiae points from a fingerprint image of the second user; selecting one of the m minutiae points as a reference point; generating a second user table containing information regarding the second user's fingerprint based on geometric changes of the other minutiae points obtained by rotating the other minutiae points by an angle about the reference point; comparing the second user table with the first user table, and selecting a similar candidate list of user tables (m and n are integers). Accordingly, it is possible to enroll a large amount of information regarding fingerprints in a database using quantization and geometric hashing while using a limited storage memory of a central database. Further, it is possible to accurately identify and detect a user's fingerprint in real time using geometric hashing and parallel processing.

19 Claims, 19 Drawing Sheets

FOREIGN PATENT DOCUMENTS

KR 2003-0044463 6/2003
KR 1020030049643 6/2003

* cited by examiner ( Θ: QUANTIZED DIRECTIONS)

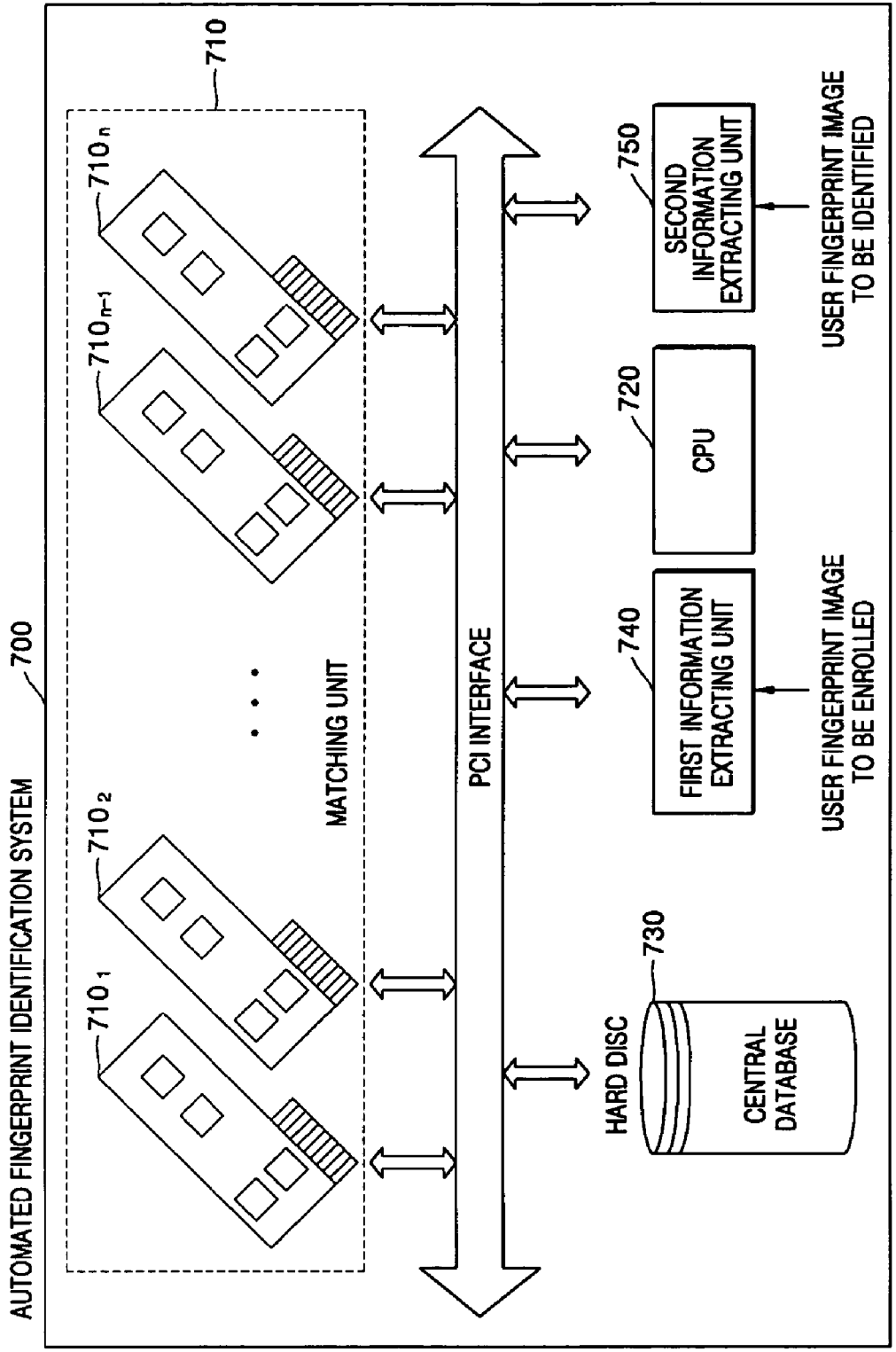

METHOD AND APPARATUS FOR IDENTIFYING A FINGERPRINT

This application claims the priority of Korean Patent Application No. 2003-80542, filed on Nov. 14, 2003 in the Korean Intellectual Property Office, the disclosure of which is incorporated herein in its entirety by reference.

BACKGROUND OF THE INVENTION

1. Field of the Invention

The present invention relates to a method and apparatus for identifying a fingerprint, and more particularly, to a method and apparatus for identifying a user's fingerprint for automatic personal identification, based on a large capacity of database, using geometric hashing and parallel processing.

2. Description of the Related Art

In general, a personal identification system requires users to present their identifiers (IDs) and passwords for authentication, thus causing user's inconvenience. An automated fingerprint identification system alleviates this inconvenience and is very reliable since it is capable of identifying users based on their fingerprints. Thus, the automated fingerprint identification system can substitute for such a personal identification system. The automated fingerprint identification system has been applied to an entry control system that provides physical security, and a computer security system that provides security via a network system, thus enabling electronic commerce such as on-line banking. Further, the automated fingerprint identification system has been used for criminal identification and immigration control.

Most conventional automated fingerprint identification systems perform two steps of enrolling and identifying users' fingerprints. In the fingerprint enrollment, fingerprints of a plurality of users are classified into ten or less categories for quick processing and then enrolled in a central database according to the categories. In general, fingerprints are classified into an arch type, a left loop type, a right loop type, a whorl type, and a tented arch type according to their shapes. After the enrollment, in the fingerprint identification, when a user's fingerprint is input for identification, its shape is examined to detect a category to which the input fingerprint belongs and the input fingerprint is compared with fingerprints belonging to the detected category to determine similarities therebetween. The fingerprint identification further includes fingerprint alignment and matching, thus increasing computational complexity. In particular, the fingerprint alignment results in computational complexity since there is no reference point for the comparison of fingerprints.

An automated fingerprint identification method and system is disclosed in a paper entitled "A Real-Time Matching System for Large Fingerprint Databases" (IEEE Transactions on Pattern Analysis and Machine Intelligence, Vol. 18, No. 8, August 1996); U.S. Pat. No. 5,572,597 entitled "Fingerprint Classification System"; and U.S. Pat. No. 5,825,907 entitled "Neural Network System for Classifying Fingerprints".

In the paper entitled "A Real-time Matching System for Large Fingerprint Databases", minutiae points of fingerprints of two users are extracted from a large capacity of database for fingerprint identification. The extracted minutiae points are amended to be matched. When determining similarity between the minutiae points based on a result of comparing their phases, it is required to extract fingerprints located at the same position and in the same direction so as to increase precision of the result of comparing. However, in general, it is difficult to exactly identify fingerprints because they have different phases and directions. Therefore, it is required to compensate the differences in phase and direction. Hough Transform may be used to compensate the differences in phase and direction.

In detail, sections of memory are allocated as three-dimensional bins that store difference values between locations and directions of respective pairs of minutiae points. Next, the difference values between the respective pairs of minutiae points are calculated and stored in the respective bins. Thereafter, a bin storing a maximum difference value is detected. The bin is set to be a difference of locations and directions between two fingerprints, and then the compensation for the two fingerprints is accomplished by using the bin. However, the compensation requires a large capacity of memory, and further, the more a number of users whose fingerprints are enrolled in the database, the lower the performance of the method.

U.S. Pat. Nos. 5,572,597 and 5,825,907 disclose automated fingerprint identification systems in which fingerprints are classified into a plurality of groups according to their shapes and stored in a large capacity of database for speedy identification. Next, when a fingerprint is input for identification, its shape is analyzed to detect a group, to which the input fingerprint belongs, from the database and fingerprint identification is performed on only the input fingerprint and a set of fingerprints belonging to the group. However, in this case, when fingerprints are improperly classified, it is impossible to identify the input fingerprint.

Such conventional automated fingerprint identification systems have the following disadvantages. First, they require a large amount of time to perform fingerprint identification, in particular, fingerprint alignment, when a number of users whose fingerprints are enrolled in a database is increased. Thus, it is impossible to identify fingerprints from a large of database in real time. Second, when fingerprints are inappropriately classified, it is impossible to exactly perform fingerprint identification. Third, the conventional automated fingerprint identification systems further require various information regarding fingerprints, in addition to their minutiae points, for an accurate fingerprint comparison, thus resulting in consumption of a large storage space of a center database.

SUMMARY OF THE INVENTION

The present invention provides a method and apparatus for identifying a user's fingerprint by performing geometric hashing and a quantization process on minutiae points of the fingerprint for automatic personal identification.

According to an aspect of the present invention, there is provided a method of identifying a fingerprint using minutiae points of the fingerprint, the method comprising (a) enrolling a fingerprint of a first user in a first database by extracting n minutiae points from a fingerprint image of the first user; selecting one of the n minutiae points as a reference point; rotating the other minutiae points by a predetermined angle with respect to the reference point; generating a first user table containing information regarding the first user's fingerprint based on geometrical changes of the other minutiae points which are obtained by the rotation; and storing the first user table in the first database; and (b) identifying a fingerprint of a second user by extracting m minutiae points from a fingerprint image of the second user; selecting one of the m minutiae points as a reference point;

generating a second user table containing information regarding the second user's fingerprint based on geometric changes of the other minutiae points obtained by rotating the other minutiae points by an angle about the reference point; comparing the second user table with the first user table, and selecting a similar candidate list of user tables, wherein m and n are integers.

According to another aspect of the present invention, there is provided an apparatus for identifying a fingerprint using minutiae points of the fingerprint, comprising a first information extracting unit which receives information regarding a first user's fingerprint that is to be enrolled in a database, extracts n minutiae points from the first user's fingerprint, sets one of the n minutiae points as a reference point, creates a first user table based on geometric characterizations of the other minutiae points, and outputs the first user table; a second information extracting unit which receives information regarding a second user's fingerprint that is to be identified, extracts m minutiae points from the second user's fingerprint, sets one of the m minutiae points as a reference point, creates a second user table based on geometric characterizations of the other minutiae points, and outputs the second user table; the database which stores the first user table; and a matching unit which compares the first user table with the second user table to determine similarities therebetween and determines whether the second user's fingerprint can be identified based on the similarities (m and n are integers).

BRIEF DESCRIPTION OF THE DRAWINGS

The above and other aspects and advantages of the present invention will become more apparent by describing in detail exemplary embodiments thereof with reference to the attached drawings in which:

FIG. 7A is a diagram of an apparatus for identifying a user fingerprint according to an embodiment of the present invention;

DETAILED DESCRIPTION OF THE INVENTION

Exemplary embodiments of the present invention will now be described more fully with reference to the accompanying drawings.

The present invention will now be briefly described for better understanding. In general, since it is difficult to obtain two fingerprint images that are located at the same position and in the same direction and have the same size, it is impossible to compare the two fingerprint images without adjustment. For this reason, it is necessary to include fingerprint alignment, which adjusts two fingerprints to the same coordinates, in fingerprint matching in which similarities between a fingerprint enrolled in a database and a fingerprint that is to be identified are measured. However, a lot of time is required to perform fingerprint alignment for the two fingerprints since there is no reference fingerprint image.

Accordingly, the present invention adopts geometric hashing for fingerprint matching, thereby removing a need for fingerprint alignment. In the geometric hashing, when a fingerprint is enrolled in a database, all expectable geometric changes in the fingerprint are also stored in the database, thus making it possible to match fingerprints without fingerprint alignment. Further, the geometric hashing allows fingerprint enrollment and identification to be processed in parallel without classifying fingerprints according to their shapes. Therefore, even when many users' fingerprints are enrolled in a large capacity database, it is possible to satisfactorily complete a fingerprint identification process.

Figure 1A:
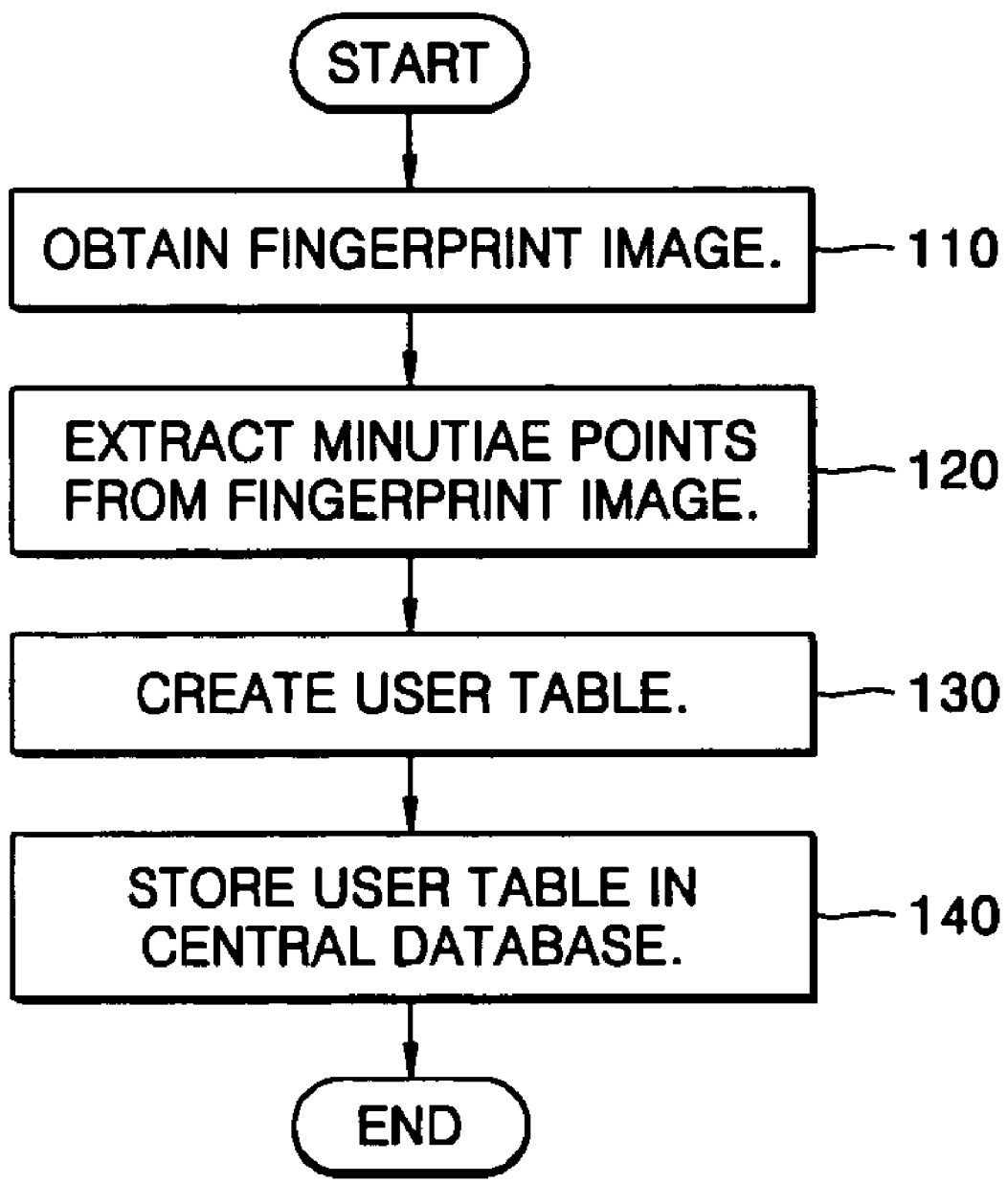
FIG. 1A is a flowchart illustrating a method of enrolling a user's fingerprint in a database according to an embodiment of the present invention.
Figure 1B:
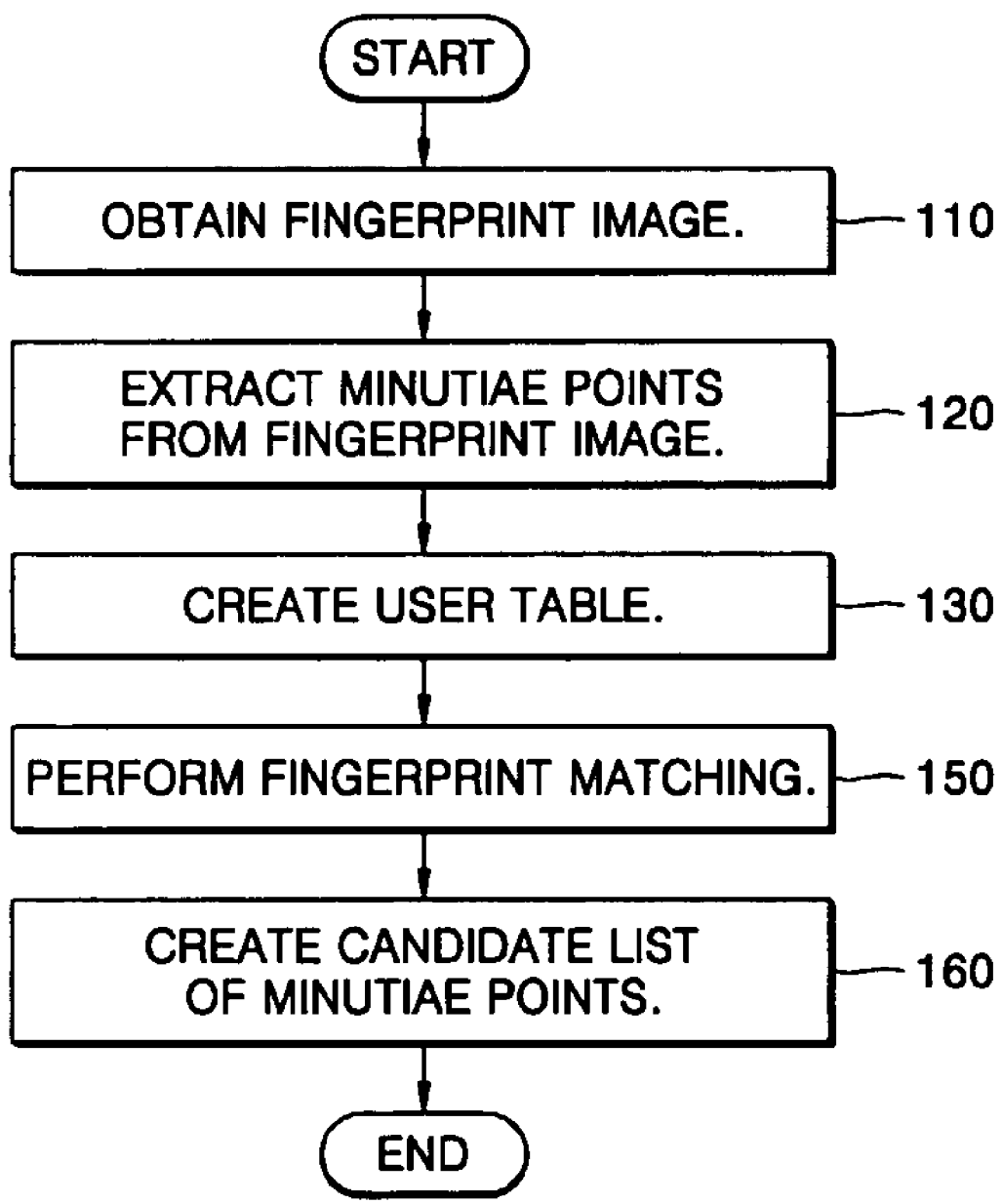
FIG. 1B is a flowchart illustrating a method of identifying a user's fingerprint according to an embodiment of the present invention.

FIGS. 1A and 1B are flowcharts illustrating an automated fingerprint identification method according to an embodiment of the present invention. FIG. 7A is a block diagram of an automated fingerprint identification apparatus according to an embodiment of the present invention. The automated fingerprint identification method according to an embodiment of the present invention includes fingerprint enrollment (see FIG. 1A) and fingerprint identification (see FIG. 1B). A method and apparatus for identifying a fingerprint using its minutiae points according to the present invention will now be described with reference to the accompanying drawings.

Referring to FIGS. 1A and 7A, a first information extracting unit 740 of FIG. 7A obtains a fingerprint image of a user whose fingerprint will be enrolled in a central database 730 using a fingerprint sensor (not shown) (step 110). Next, positions, directions, and types of minutiae points of the fingerprint image are determined (step 120). In this disclosure, the types of the minutiae points are classified into an ending point 801 and a bifurcation point 802 show in FIG. 8. The ending point 801 indicates where a ridge of fingerprint ends and the bifurcation point 802 indicates where a ridge is divided into two branches. Hereinafter, the "minutiae points" will indicate both the ending point 801 and the bifurcation point 802. After step 120, a user table is created to list geometric changes in the minutiae points (step 130) and the user table is additionally stored in the database 730 (step 140).

Referring to FIGS. 1B and 7A, a second information extracting unit 750 obtains a fingerprint image of a user whose fingerprint will be identified using the fingerprint sensor (step 110), and the minutiae points of the fingerprint image are extracted from the fingerprint image (step 120). Next, a user table is created using the minutiae points (step 130). Next, a matching unit 710 performs fingerprint matching by comparing the user table with register user tables enrolled in the database 730 and measuring similarities therebetween based on the result of comparison (step 150). Thereafter, a candidate list is created from the register user table based on the similarities (step 160).

A method of enrolling and identifying the minutiae points will now be described in greater detail. In step 120, information regarding only positions, directions, and types of the minutiae points are stored in the database 730, thus saving memory of the database 730. The positions of the minutiae points are specified with their coordinates measured at a plane, the directions are indicated by inclinations of the minutiae points, and the types include the ending point 801 and the bifurcation point 802.

Figure 2:
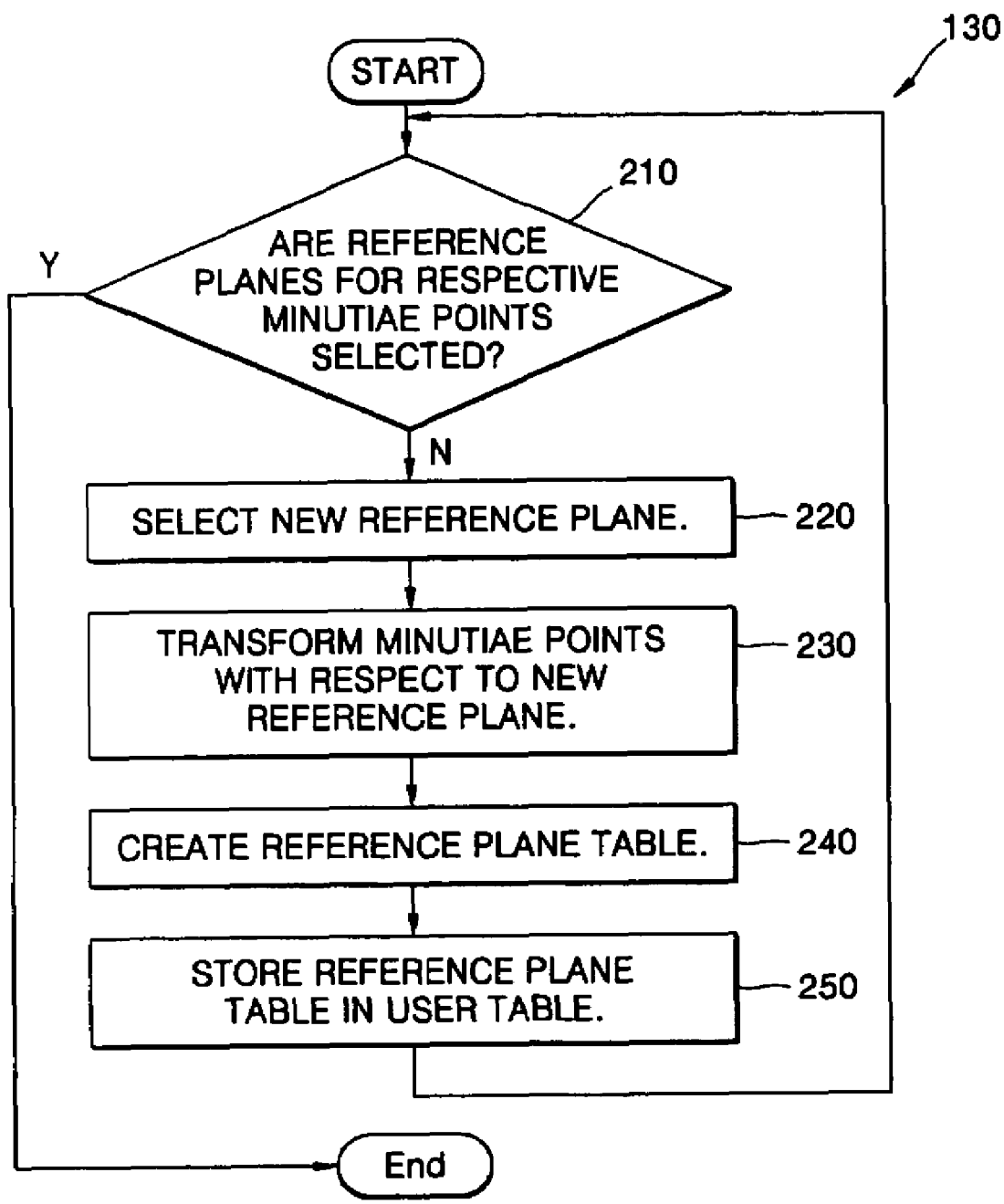
FIG. 2 is a flowchart illustrating a method of making a user table, according to an embodiment of the present invention.

FIG. 2 is a detailed flowchart illustrating step 130 of FIGS. 1A and 1B. Referring to FIG. 2, it is determined whether a reference plane is selected for all the minutia points (step 210). If it is determined in step 210 that the reference plane is not selected, a new reference plane is selected using the minutiae points obtained in step 120 (step 220). Next, the minutiae points are transformed while changing their positions and directions with respect to the new reference plane (step 230). Next, a reference plane table is created using the transformed minutiae points (step 240) and the created reference plane table is included in a predetermined user table (step 250). Thereafter, returning to step 210, it is determined whether a reference plane is selected for all the minutiae points obtained in step 120, and if it is determined in step 210 that the reference plane is not selected, steps 220 through 250 are repeated.

In step 220, a new reference plane may be selected based on information regarding one or more minutiae points obtained in step 120.

Figure 3A:
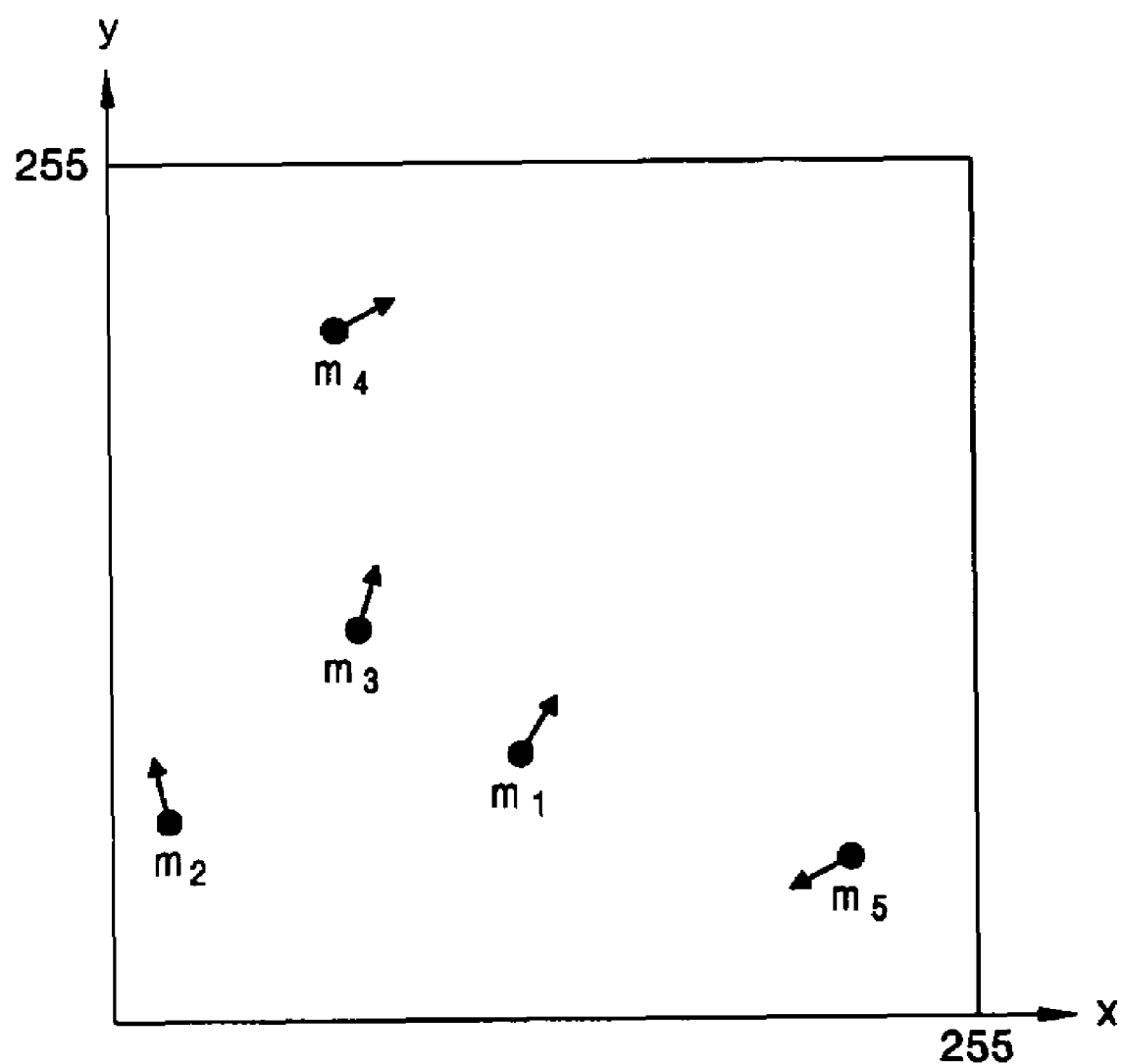
FIG. 3A illustrates minutiae points extracted from a fingerprint image according to an embodiment of the present invention.
Figure 3B:
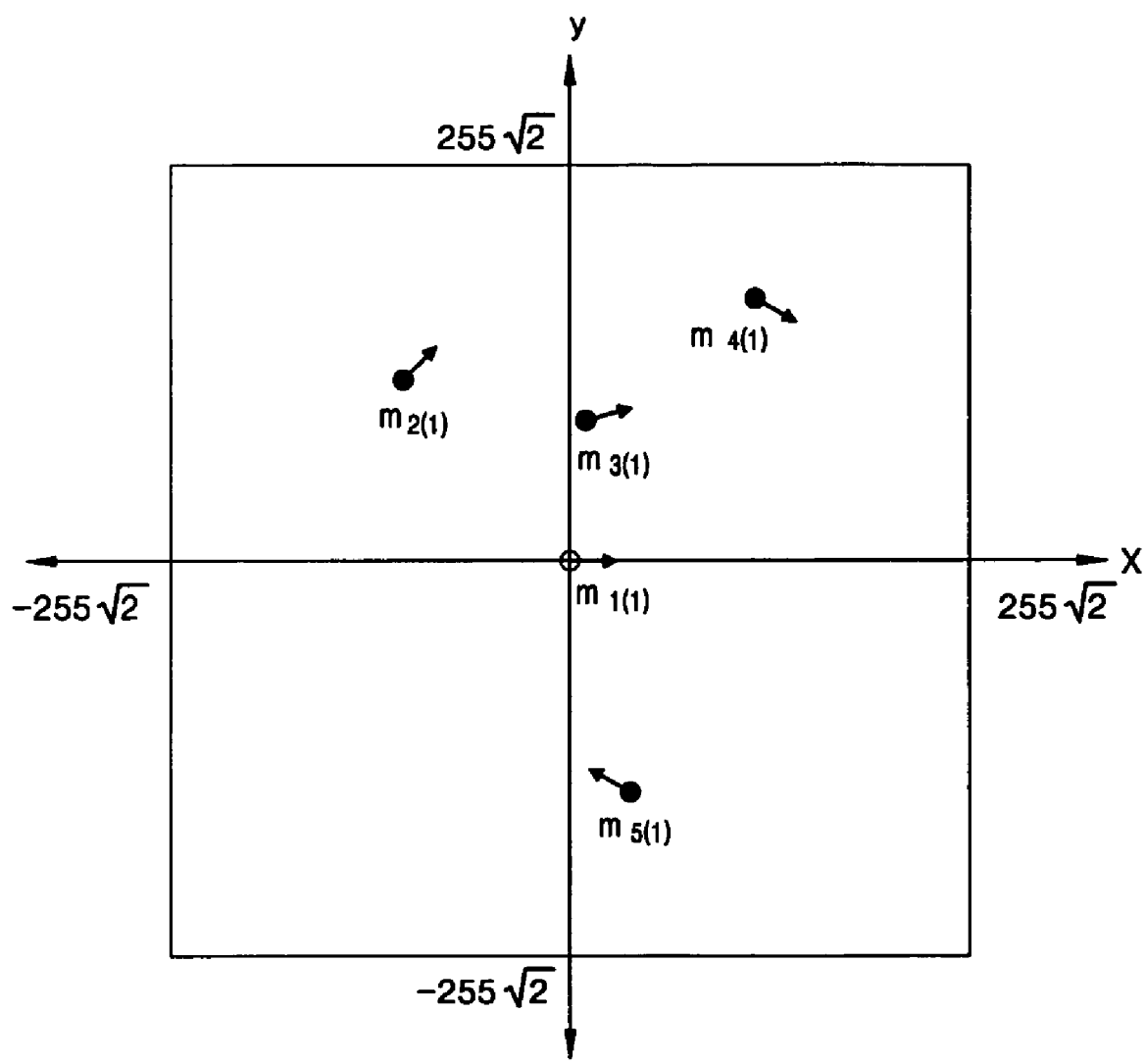
FIG. 3B illustrates the minutiae points of FIG. 3A geometrically transformed based on information regarding a minutiae point according to an embodiment of the present invention.

FIGS. 3A and 3B illustrate the selection of a new reference plane in step 220 based only on the information on one of the minutiae points obtained in step 120. It is assumed that points $m_1$ through $m_5$ of FIG. 3A are the minutiae points obtained in step 120. First, a reference plane of the minutia point $m_1$ is selected, coordinates of the minutia point $m_1$ being determined as the origin of the reference plane and a direction indicated by an arrow of the minutia point $m_1$ being determined as a direction of X-axis of the reference plane (step 220). Next, the other minutiae points $m_2$ through $m_5$ are transformed with respect to the reference plane of the minutia point $m_1$, thus obtaining the transformed minutiae points $m_{2(1)}$, $m_{3(1)}$, $m_{4(1)}$, and $m_{5(1)}$ (step 230).

Figure 4:
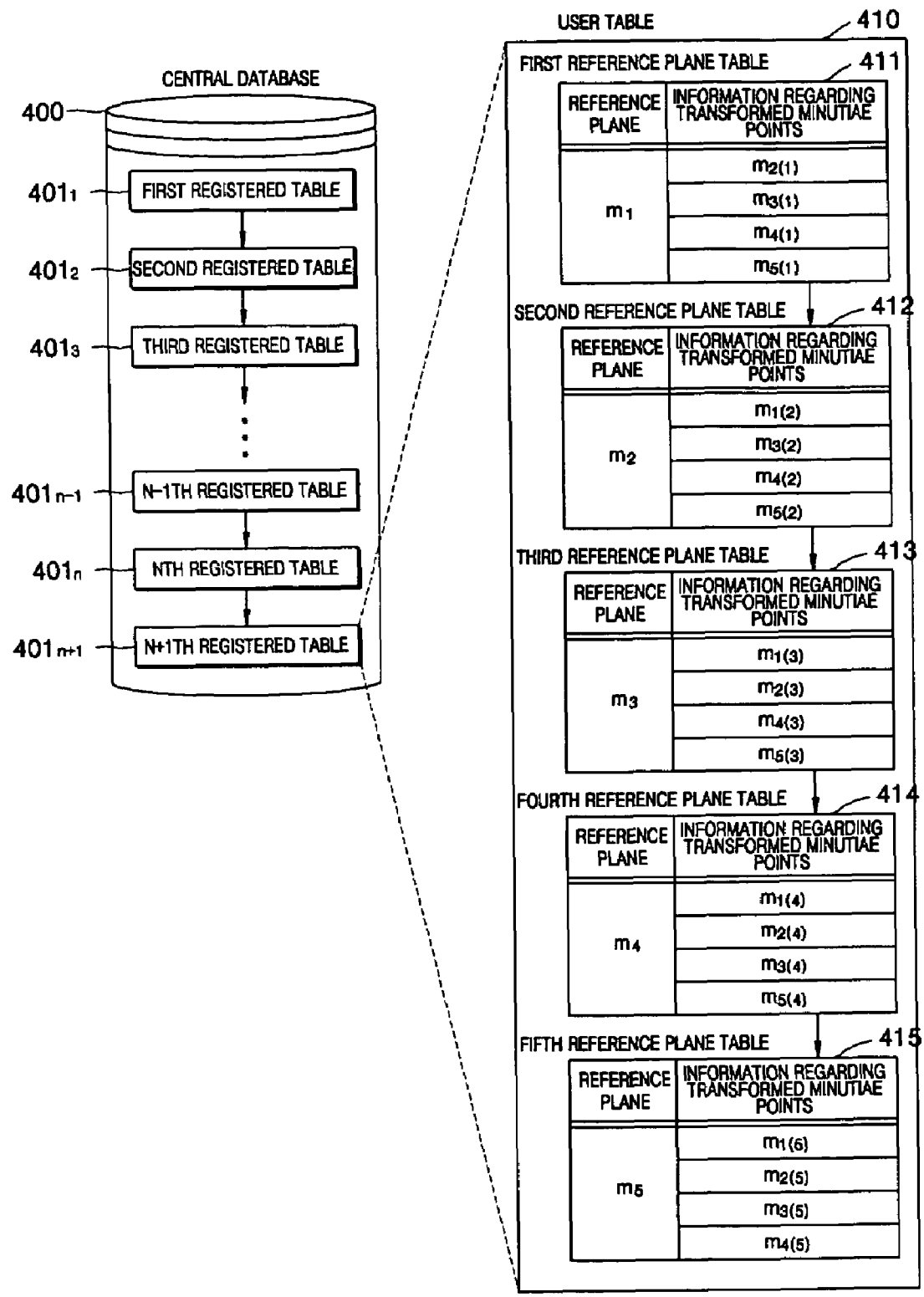
FIG. 4 illustrates structures of register tables stored in a central database and a user table including reference plane tables according to an embodiment of the present invention.

FIG. 3B illustrates an example of creation of a reference plane table 411, shown in FIG. 4, of the minutia point $m_1$ by transforming the other minutiae points $m_2$ through $m_5$ after creating a new reference plane using the minutia point $m_1$ of FIG. 3A. The reference plane table 411 is stored in a user table 410 of FIG. 4 (step 250). Also, information regarding the transformed minutiae points $m_{2(1)}$, $m_{3(1)}$, $m_{4(1)}$, and $m_{5(1)}$ is stored in the user table 410.

In step 240, information regarding positions, directions, and types of the transformed minutiae points are stored in reference plane tables 411 through 415 of FIG. 4.

The steps described with reference to FIGS. 3A and 3B are repeatedly performed to obtain reference plane tables, such as those of FIG. 3E, for the respective minutiae points $m_2$, $m_3$, $m_4$, and $m_5$, and then, the user table 410 for a user is created.

The user table 410 for the user is additionally stored in the central database 730 (step 140).

FIG. 4 illustrates a structure of a central database 400 (this is equivalent to the database 730) in which a user's fingerprint is stored based on information regarding only a minutia point. It is assumed that the database 400 has n stored registered user tables $401_1$ through $401_n$, and an n+1$^{th}$ table $401_{n+1}$ containing information regarding the user's fingerprint is additionally stored therein. A structure of the table $401_{n+1}$ is as shown in the user table 410.

As described above, when enrolling the user's fingerprint, reference plane tables for the respective minutiae points of the fingerprint are created and stored while considering geometric changes in the minutiae points obtained in step 120, which are measured, for example, by rotating or moving the fingerprint image to different positions. Accordingly, it is possible to accurately identify a fingerprint by measuring similarities between the fingerprint and fingerprints enrolled in a database without fingerprint alignment.

Figure 3C:
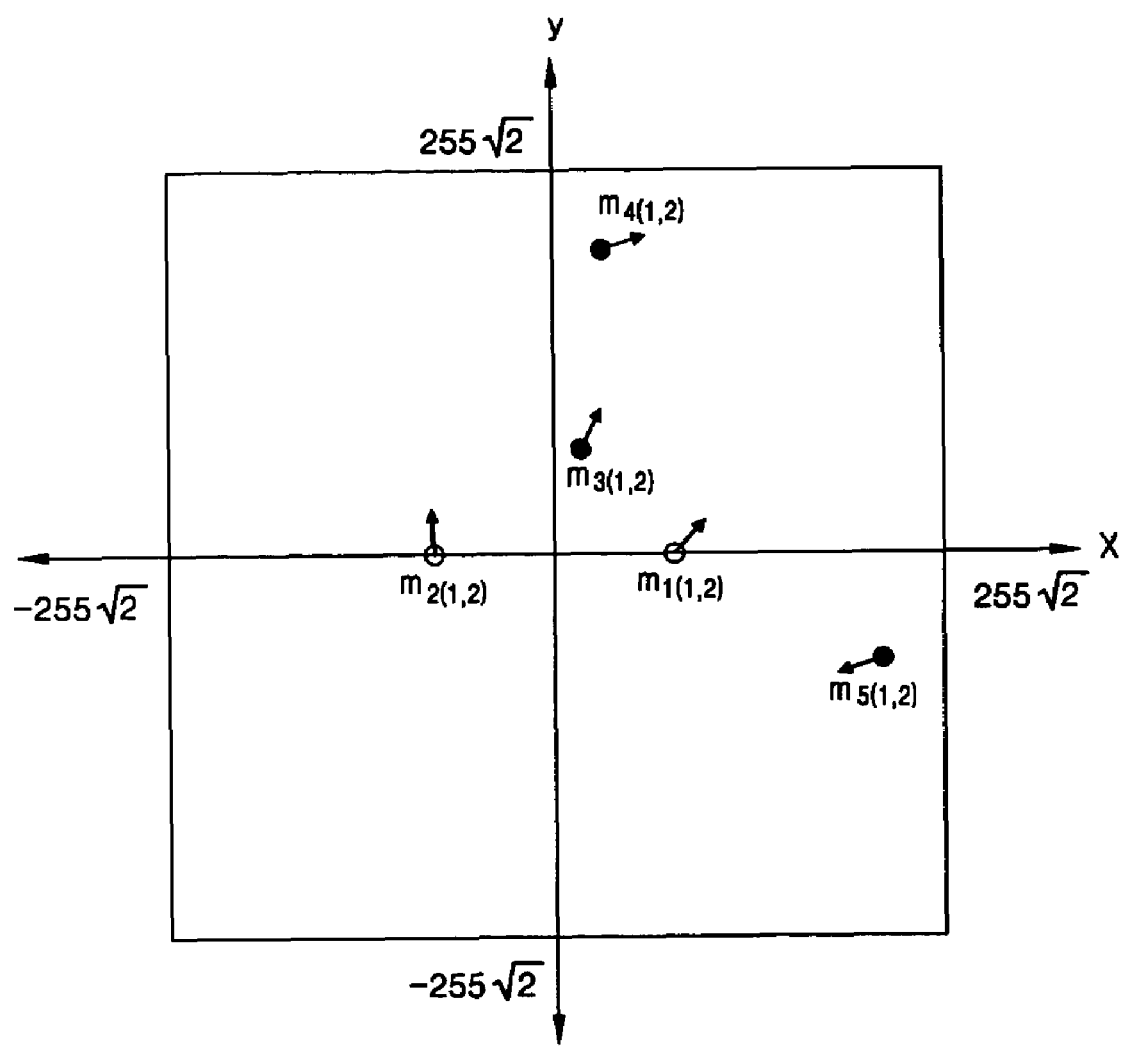
FIG. 3C illustrates minutiae points obtained by geometrically transforming the minutiae points of FIG. 3A using a distance between two minutiae points as an actual distance according to another embodiment of the present invention.
Figure 3D:
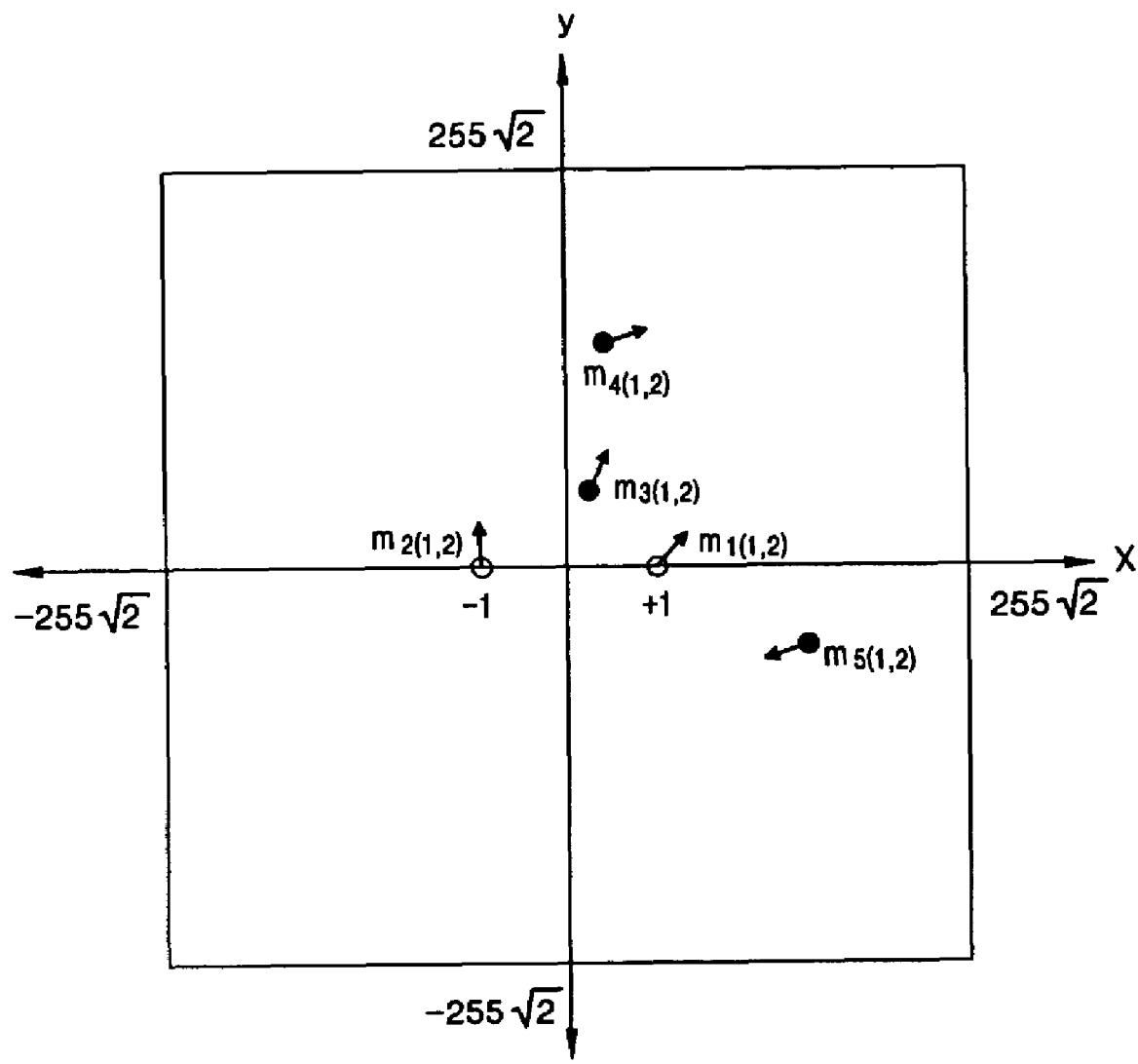
FIG. 3D illustrates minutiae points obtained by geometrically transforming the minutiae points of FIG. 3A using the distance between two minutiae points as a unit distance according to yet another embodiment of the present invention.

A method of creating a reference plane table using information regarding two minutiae points will now be described with reference to FIGS. 3C and 3D. First, a reference plane for the two minutiae points $m_1$ and $m_2$ is selected, a center point of coordinates of the minutiae points $m_1$ and $m_2$ being determined as the origin of the reference plane and a line segment of the two minutiae points $m_1$ and $m_2$ being determined as a reference axis of the reference plane (step 220). FIG. 3C illustrates minutiae points $m_{3(1,2)}$ through $m_{5(1,2)}$ obtained by transforming the minutiae points $m_3$ through $m_5$ with respect to the reference plane obtained using the two minutiae points $m_1$ and $m_2$, using a distance between the two minutiae points $m_1$ and $m_2$ as an actual distance (step 230). FIG. 3D illustrates minutiae points $m_{3(1,2)}$ through $m_{5(1,2)}$ obtained by transforming the minutiae points $m_3$ through $m_5$ with respect to the reference plane obtained using the two minutiae points $m_1$ and $m_2$, using a distance between the two minutiae points $m_1$ and $m_2$ as a unit distance (step 230).

Figure 3E:
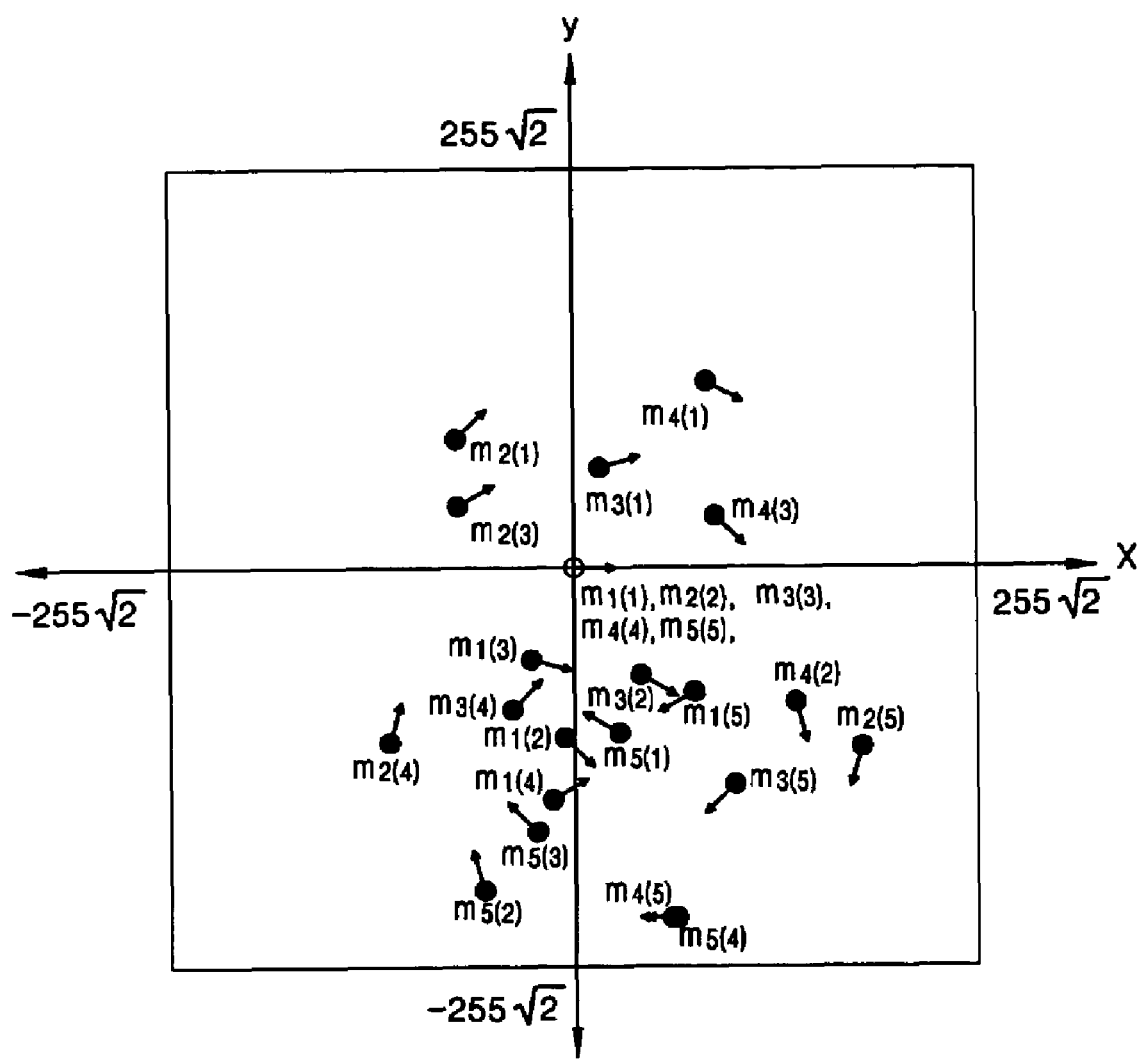
FIG. 3E illustrates minutiae points obtained by geometrically transforming the minutiae points of FIG. 3A based on information regarding five minutiae points according to still another embodiment of the present invention.

Referring to FIG. 3E, as a number of users whose fingerprints are enrolled increases, information regarding the minutiae points of the fingerprints also increases, thereby increasing a size of the user table 410 of FIG. 4. To solve this problem, a method of reducing the size of the user table 410 according to the present invention will now be described in greater detail with reference to FIGS. 5A and 5B.

Figure 5A:
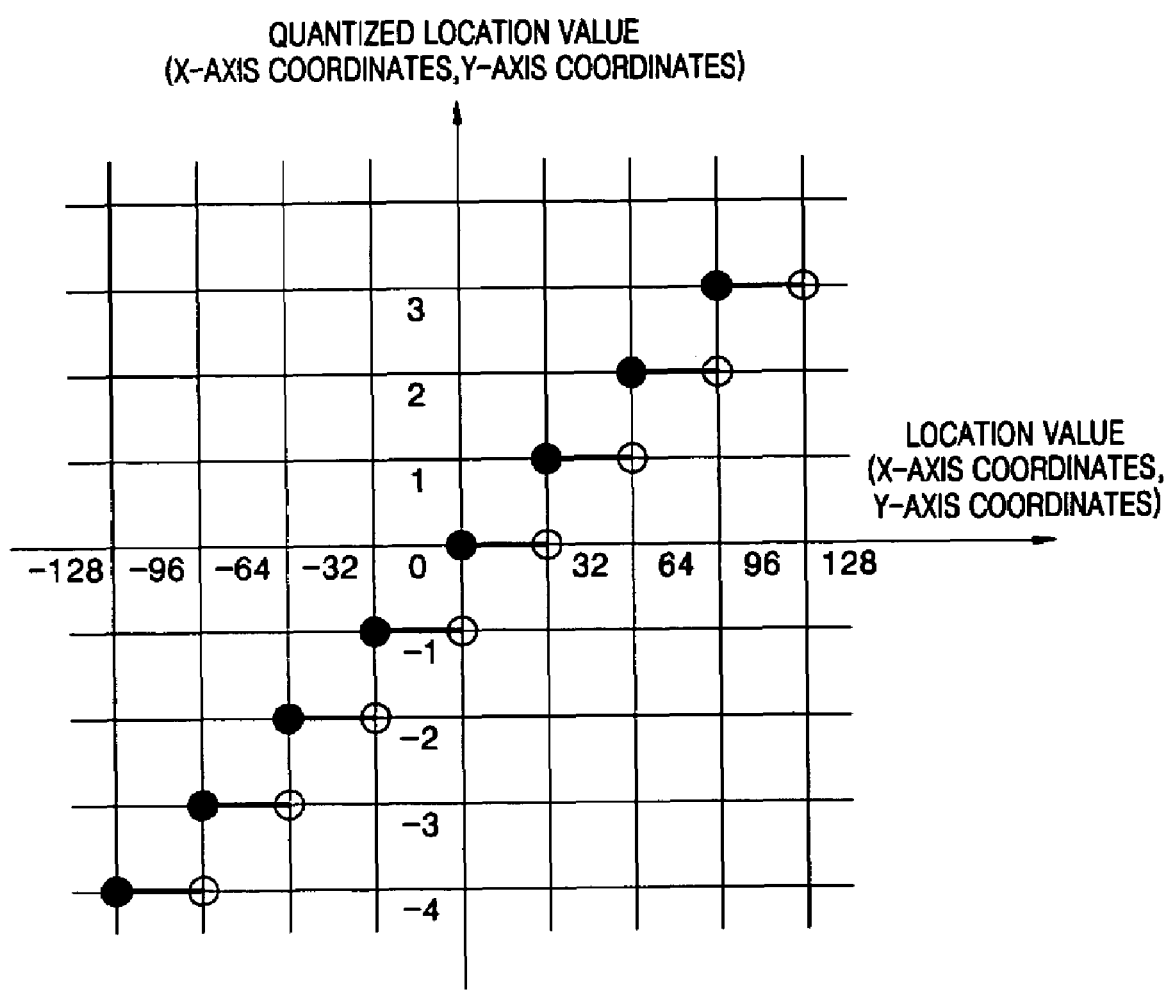
FIG. 5A illustrates quantized information regarding locations of transformed minutiae points according to an embodiment of the present invention.

According to the present invention, a size of a user table is reduced by quantizing information regarding locations and directions of transformed minutiae points at predetermined intervals or variable intervals. FIG. 5A illustrates quantized information regarding locations of transformed minutiae points according to an embodiment of the present invention. In detail, referring to FIG. 5A, the information regarding locations is quantized into equal units of 32 parts. If 10 bit data is required to express the information regarding the locations of the transformed minutia points for respective X-axis and Y-axis coordinates, only 3 bit data for the respective X-axis and Y-axis coordinates are needed when the information regarding locations is quantized.

Figure 5B:
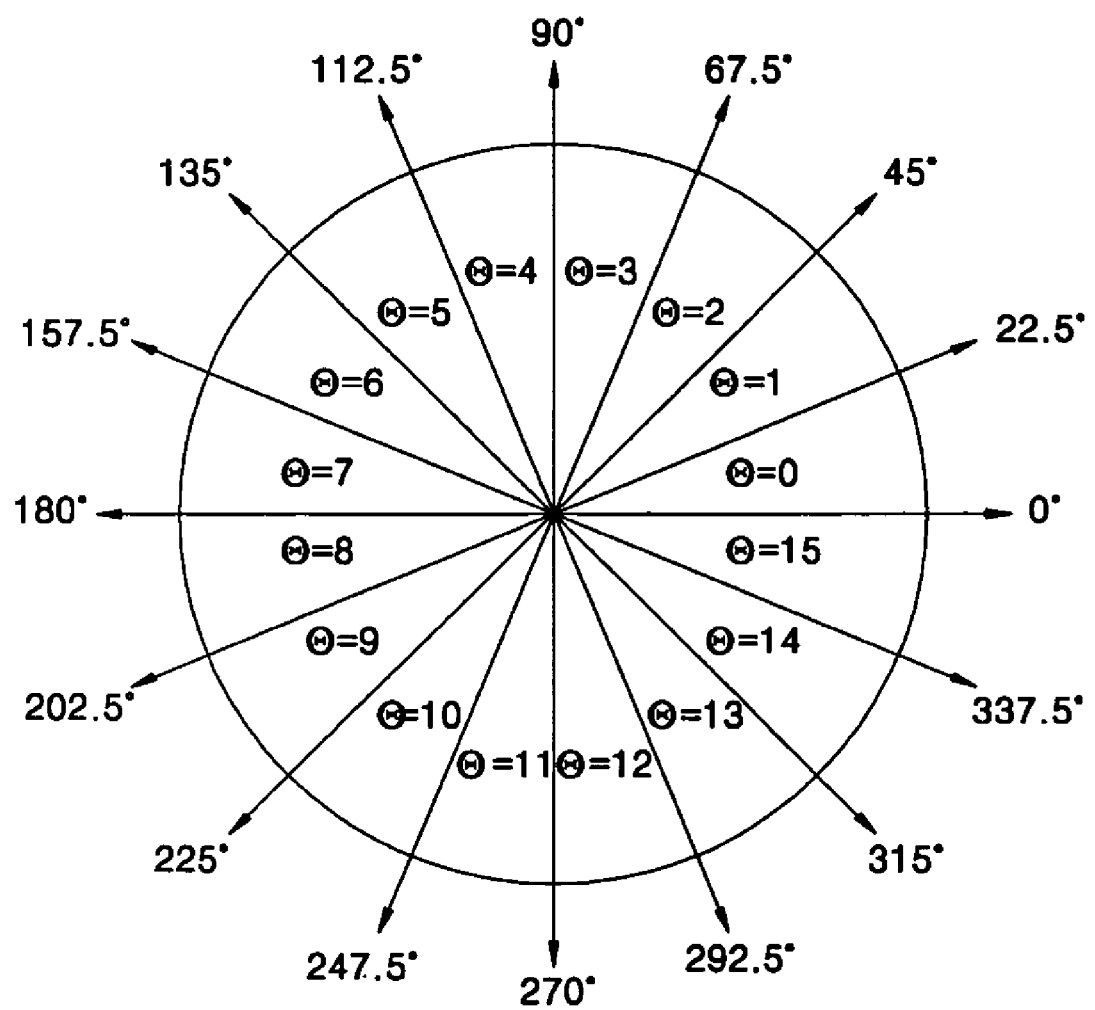
FIG. 5B illustrates quantized information regarding directions of transformed minutiae points according to an embodiment of the present invention.

FIG. 5B illustrates quantized information regarding directions of transformed minutiae points according to an embodiment of the present invention. Referring to FIG. 5B, the information regarding the directions of transformed minutiae points is quantized into 16 equal parts of 22.5 degrees each. It is assumed that 9 bit data is required to express the information of 1 degree of the entire 360 degrees. However, when the information is quantized in units of 16 parts of 22.5 degrees each, only 4 bit data is required to express the respective information of the 22.5 degrees, thereby reducing the size of the user table.

After enrolling all users' fingerprints, fingerprint identification is performed. Referring to FIG. 1B, for fingerprint identification, a fingerprint image of a user whose fingerprint will be identified is obtained using a fingerprint sensor (not shown) (step 110), and minutiae points of the user's fingerprint are extracted from the fingerprint image (step 120). Next, a user table is created using the extracted minutiae points (step 130). Next, the created user table is matched by comparing it with user tables enrolled in the database 730 (step 150), and a candidate list of user tables is created based on similarities between the created user table and the other user tables (step 160).

Steps 110 through 130 are performed in the same manner in which steps 110 through 130 of fingerprint enrollment are performed.

Figure 3F:
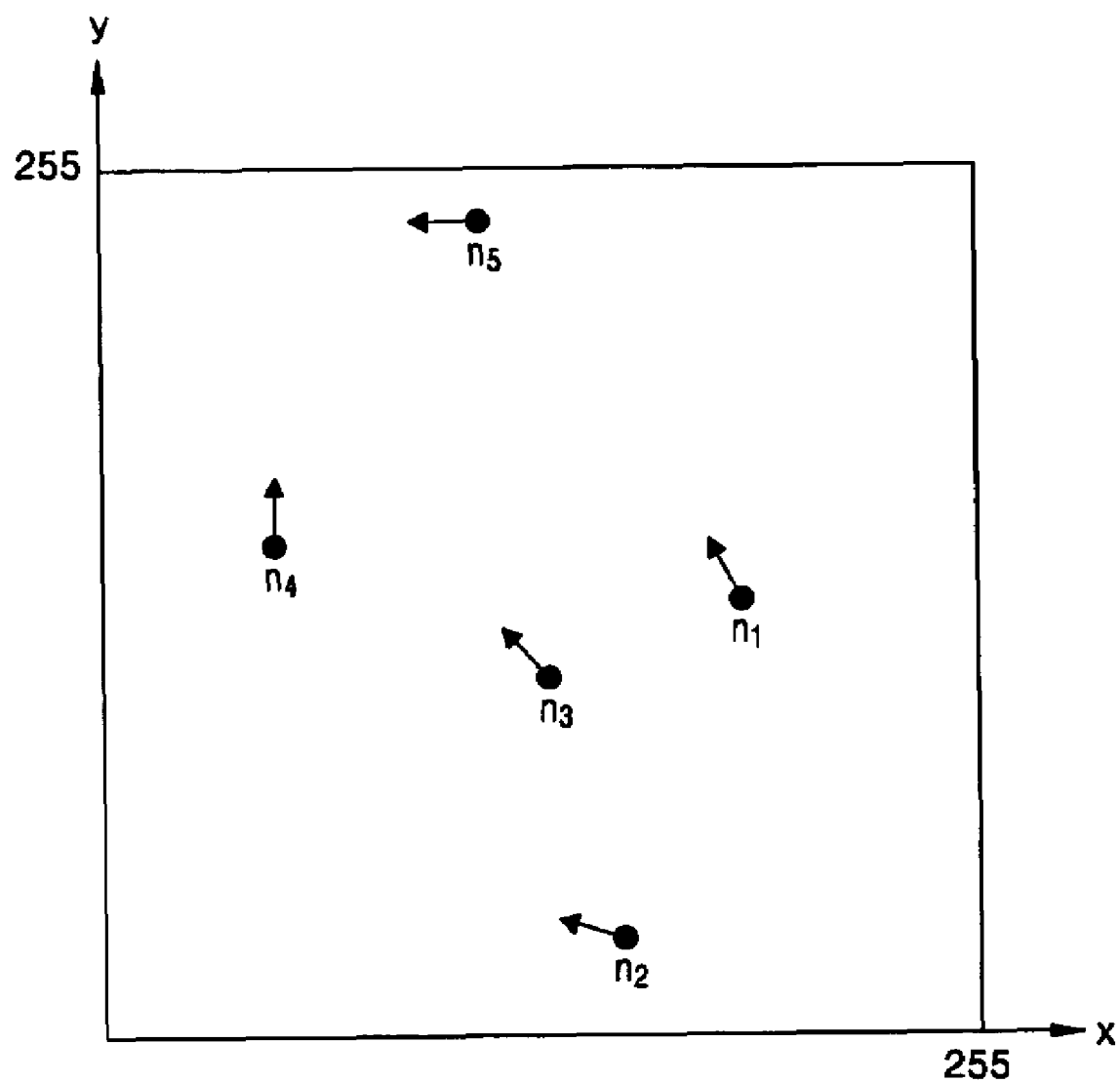
FIG. 3F illustrates minutiae points extracted from a fingerprint image according to another embodiment of the present invention.
Figure 3G:
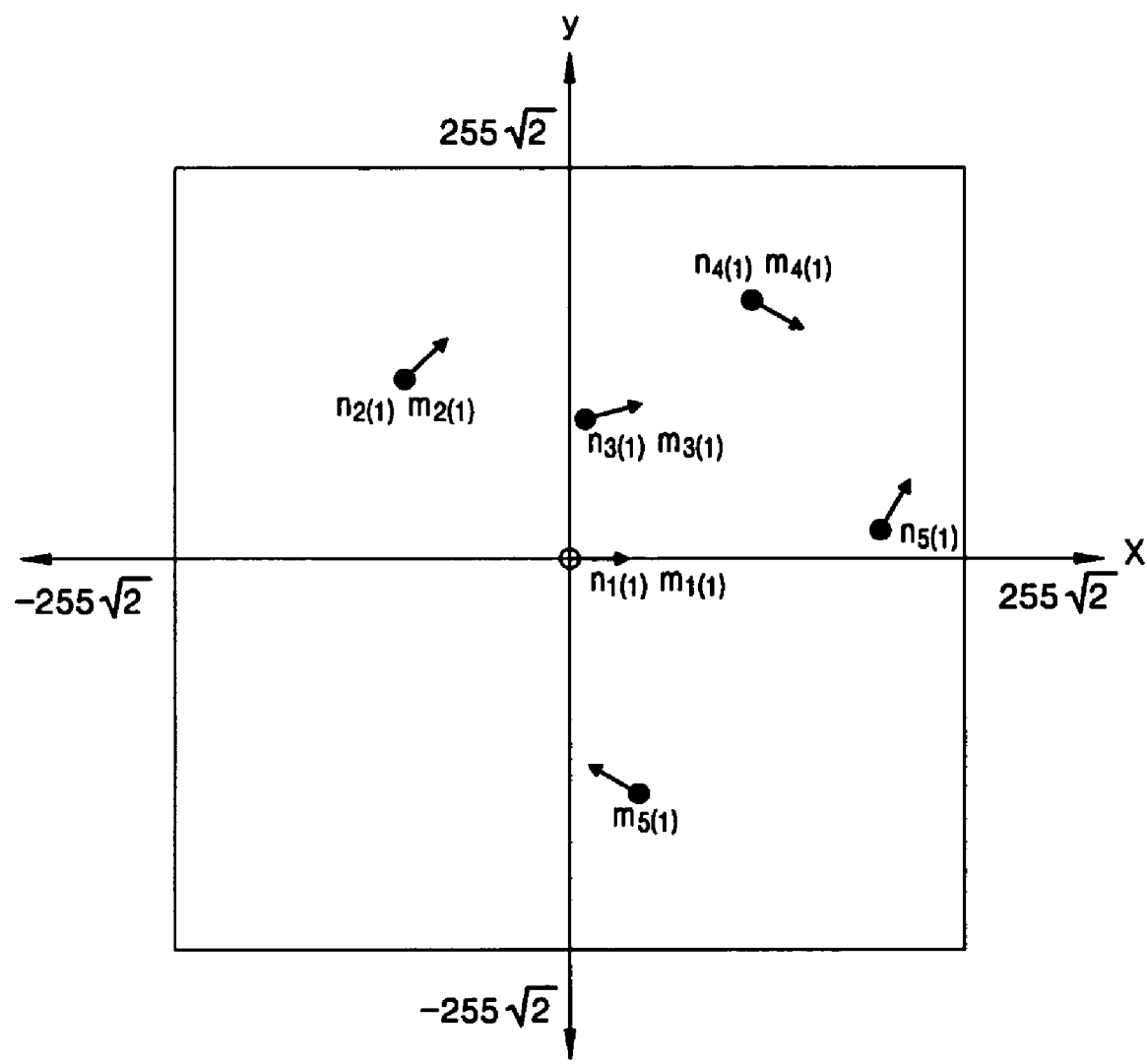
FIG. 3G illustrates the minutiae points of FIG. 3F geometrically transformed based on information regarding a minutiae point, according to an embodiment of the present invention.
Figure 3H:
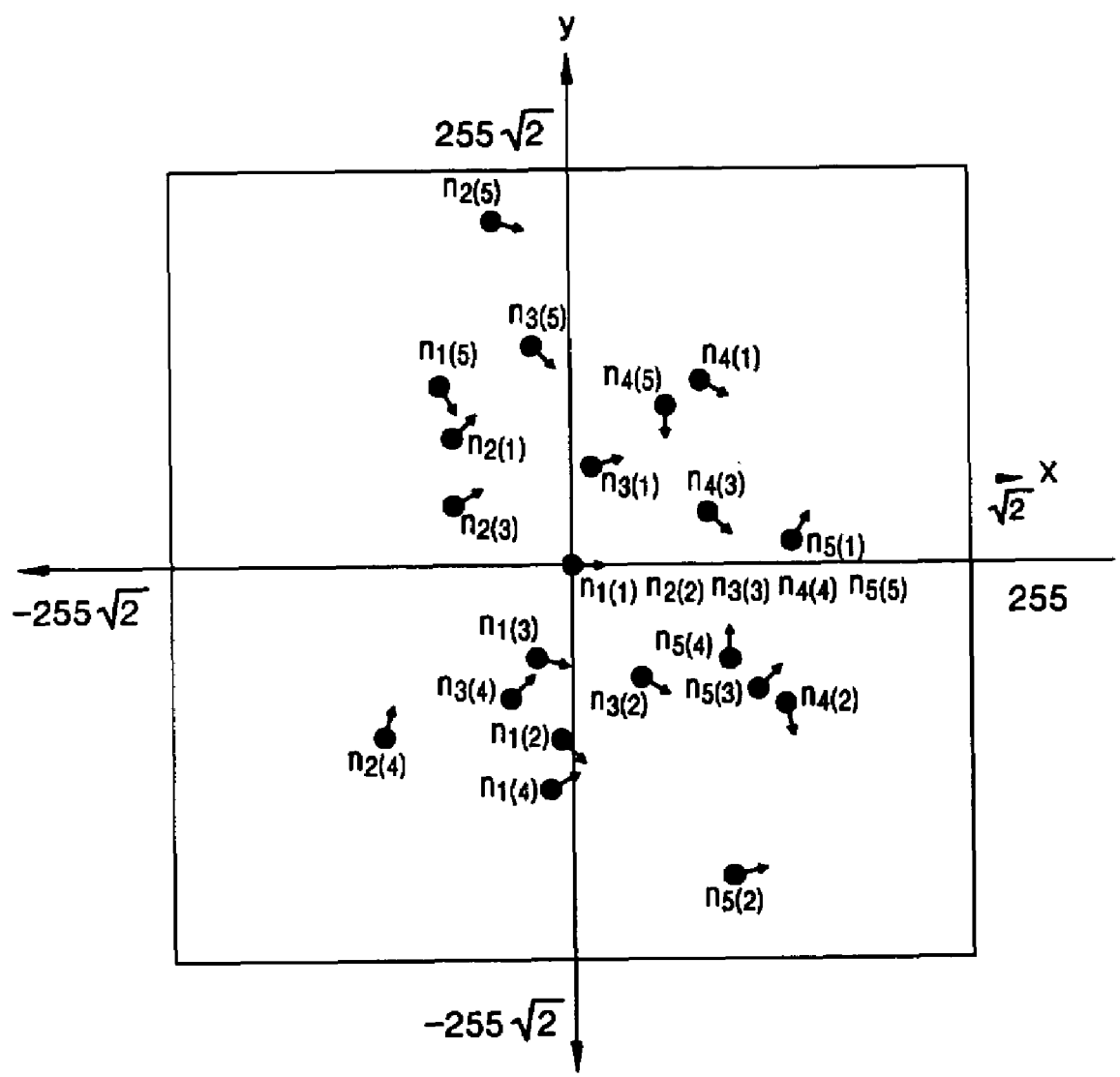
FIG. 3H illustrates the minutiae points of FIG. 3A geometrically transformed based on information regarding five minutiae points according to another embodiment of the present invention.

FIG. 3F illustrate minutiae points extracted from a fingerprint image during fingerprint identification according to another embodiment of the present invention. It is assumed that minutiae pointes $n_1$, $n_2$, $n_3$, $n_4$, and $n_5$ are extracted from a fingerprint image of a user who is to be identified (step 120) and the user is the same person as in FIG. 3A. FIG. 3G illustrates minutiae points $n_{2(1)}$, $n_{3(1)}$, $n_{4(1)}$, and $n_{5(1)}$ obtained by transforming the minutiae points $n_2$, $n_3$, $n_4$, and $n_5$ of FIG. 3F with respect to a reference plane obtained using the minutia point $n_1$ of FIG. 3F. FIG. 3H illustrates minutiae points obtained by performing the method of FIG. 2 on each of the minutiae points $n_1$, $n_2$, $n_3$, $n_4$, and $n_5$ to obtain their reference planes.

In this disclosure, the user table obtained in step 130 of fingerprint identification will be referred to as a cognitive table for convenience.

Fingerprint matching (step 150) in which similarities between the cognitive table and user tables enrolled in the database 730 are measured will now be described with reference to FIG. 3G. FIG. 3G illustrates a measurement of similarities between the reference plane table of FIG. 3H based on the cognitive table obtained using the minutia point $n_1$ and the reference plane table of FIG. 3B based on the reference plane table obtained using the minutia point $m_1$. When these two tables overlap each other, four pairs of minutiae points $n_{1(1)}$ and $m_{1(1)}$, $n_{2(1)}$ and $m_{2(1)}$, $n_{3(1)}$ and $m_{3(1)}$, and $n_{4(1)}$ and $m_{4(1)}$ are determined to be equal in terms of their positions and directions. However, both minutiae points $n_{5(1)}$ and $m_{5(1)}$ are not equal to any other minutiae points regarding their positions and directions. This problem may be caused by erroneously obtaining a fingerprint image or erroneously extracting the minutiae points $n_{5(1)}$ and $m_{5(1)}$ from the fingerprint image. As described above, the similarities between a reference plane table of the cognitive table and a reference plane table of the enrolled user table for fingerprint matching is measured by counting a number of equivalent minutiae points of the reference plane tables without compensating for differences between fingerprints.

Then, all reference plane tables of the cognitive table are compared with all reference plane tables of the enrolled user table to obtain the similarities therebetween, and a candidate list of users table is selected based on the similarities (step 160).

However, in fingerprint enrolment and identification, it is difficult to obtain minutiae points located at the same positions and in the same directions in step 120 due to various noise occurring when obtaining the user fingerprint image in step 110. To solve this problem and reduce the amount of calculation for fingerprint matching of step 150, the present invention sets ranges of allowable errors regarding locations and directions of minutiae points. The ranges of allowable errors are used to detect pairs of equivalent minutiae points of the cognitive table of FIG. 3H and the enrolled user table stored in the database 730.

FIG. 5B illustrates a method of setting a range of allowable errors regarding locations of minutiae points according to an embodiment of the present invention. The range of allowable errors varies according to a quantization size of information regarding locations of the minutiae points. In FIG. 5B, a quantization size and a range of allowable errors are determined as 22.5 degrees and [−1,1], respectively. In this case, when a direction value of a transformed minutia point of the cognitive table is 0, direction values 15, 0, and 1 are determined to fall within a range of allowable errors, that is, they are determined to indicate the same direction.

Figure 6A:
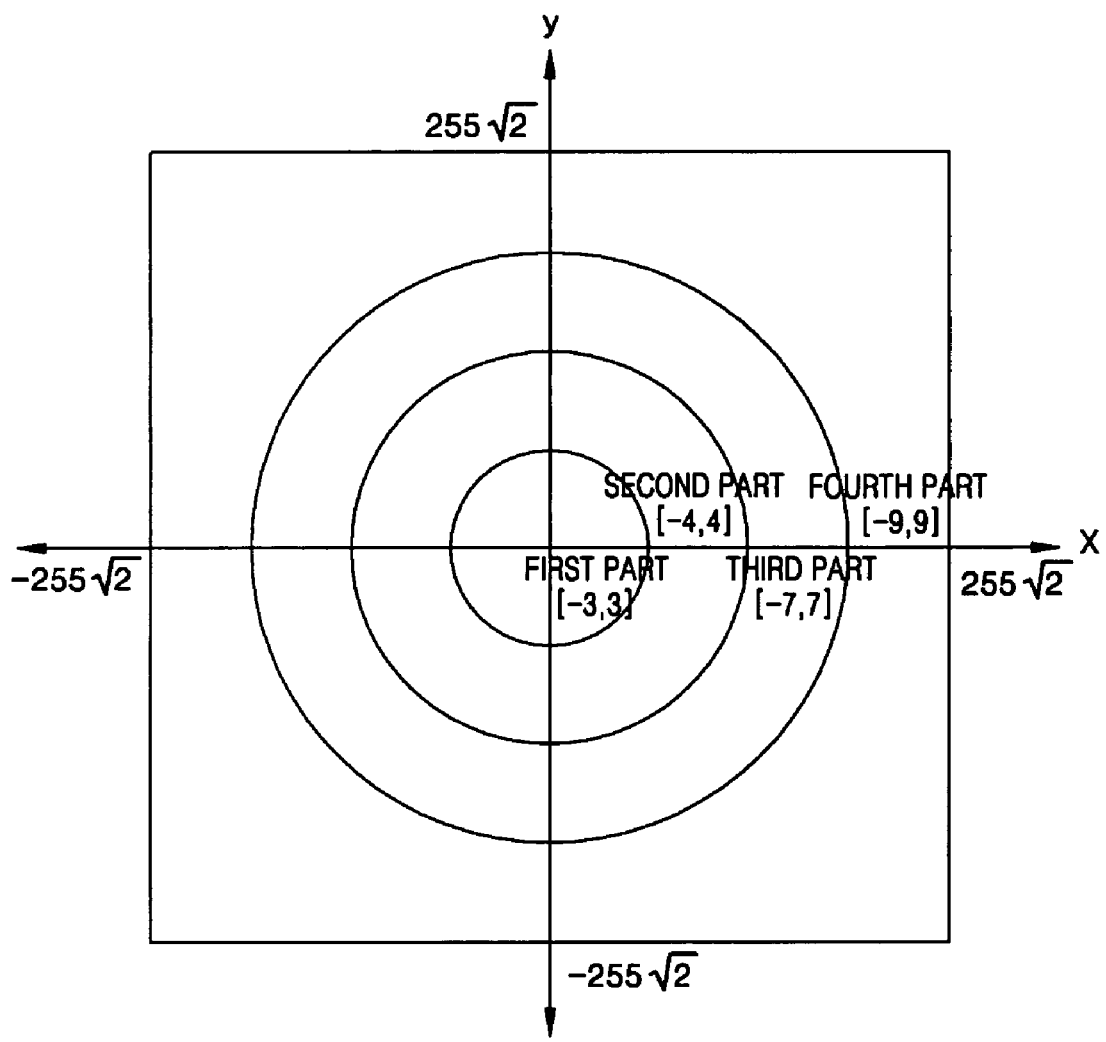
FIG. 6A illustrates a range of allowable errors of information regarding locations of transformed minutiae points according to an embodiment of the present invention.
Figure 6B:
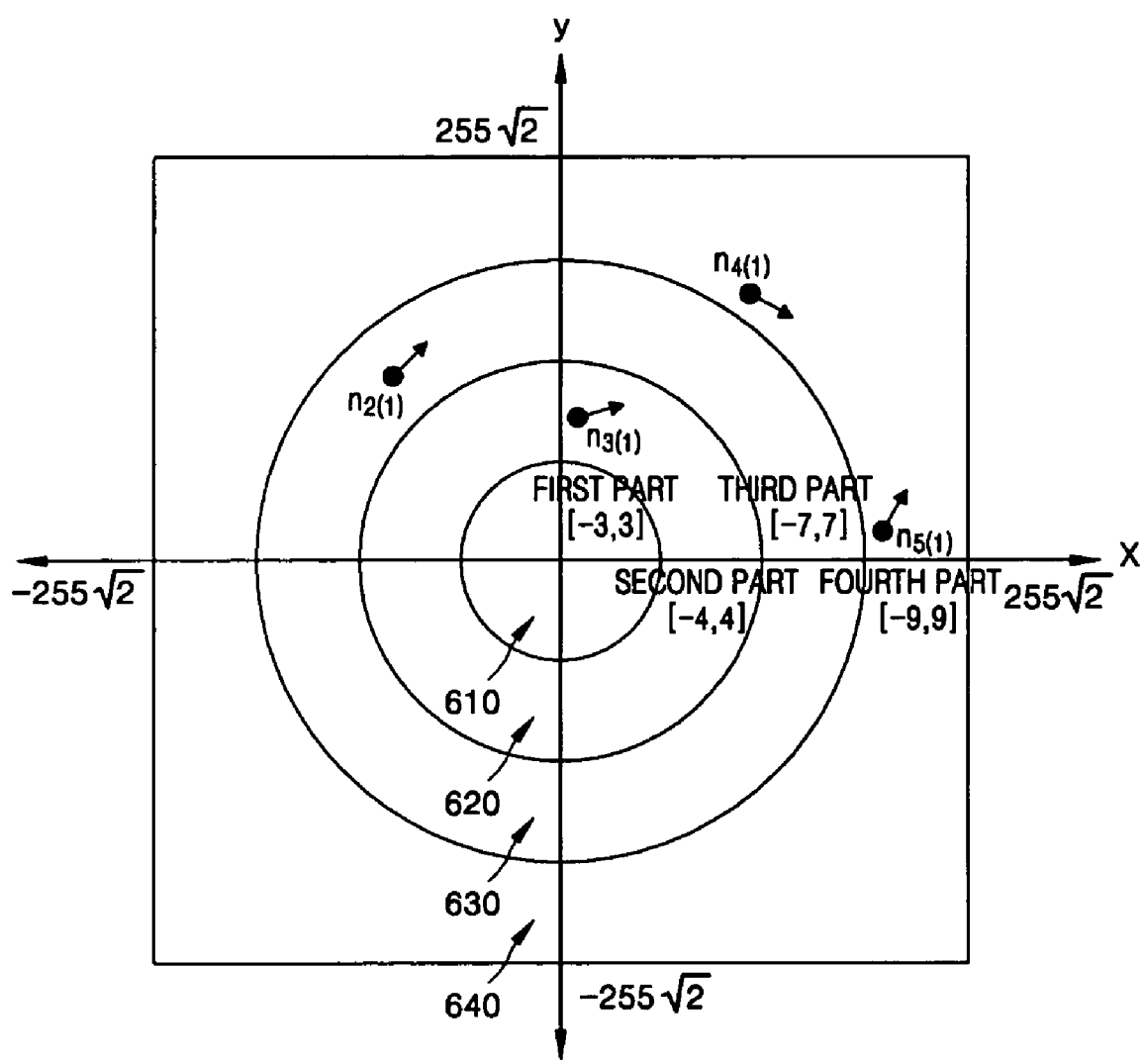
FIG. 6B illustrates an example of applying the range of allowable errors illustrated by FIG. 6A to transformed minutiae points.

FIG. 6A illustrates a method of setting ranges of allowable errors for positions of minutiae points according to an embodiment of the present invention. Referring to FIG. 6A, a reference plane is divided into four equal parts along a radius of a circle centered at the origin of the reference plane and different ranges of allowable errors are set for the four parts. FIG. 6B illustrates a method of applying the divisions of the reference plane as illustrated by FIG. 6A to the transformed minutiae points $m_{2(1)}$, $m_{3(1)}$, $m_{4(1)}$, and $m_{5(1)}$ of FIG. 3B. Referring to FIG. 6B, the transformed minutiae points belonging to a second part 620 fall within a range of allowable errors, ranging from −4 to +4 with respect to X-axis and Y-axis coordinates. The transformed minutiae points $m_{2(1)}$ and $m_{5(1)}$, which belong to a third part 630, fall within a range of allowable errors, ranging from −7 to +7 with respect to the X-axis and Y-axis coordinates. When two minutiae points fall within one of the above ranges of allowable errors, they are determined to be equivalent to each other.

A method of performing fingerprint enrollment and identification in parallel using an automated fingerprint identification system according to an embodiment of the present invention will now be described with reference to FIG. 7A. FIG. 7A illustrates a structure of an automated fingerprint identification system 700 according to an embodiment of the present invention. As previously mentioned, the central database 730 of the automated fingerprint identification system 700 stores every possible user table. When the automated fingerprint identification system 700 is booted, the user tables stored in the database 730 are divided into predetermined numbers of groups and distributed to N peripheral component interconnection (PCI) cards 710₁ through 710$_n$. Then the divided user tables are stored in buffer modules 717.

In this embodiment, 1024 user tables are stored in respective PCI cards 710₁ through 710$_n$, and the respective PCI cards 710₁ through 710$_n$ align their 1024 user tables based on similarities between the user tables to select top 10 user tables. Next, a central processing unit (CPU) 720 obtains a final group of top 10 candidates using the top 10 user tables selected by the PCI cards 710₁ through 710$_n$. However, a number of final top candidates according to the present invention is not limited. That is, the number of final top candidates may vary according to a system capacity. Accordingly, when a number of users whose fingerprints are enrolled in the database 730 of the automated fingerprint identification system 700 is increased, it is possible to perform fingerprint enrollment and identification without a time delay by increasing a number of the PCI cards 710₁ through 710$_n$ installed in the matching unit 710.

Figure 7B:
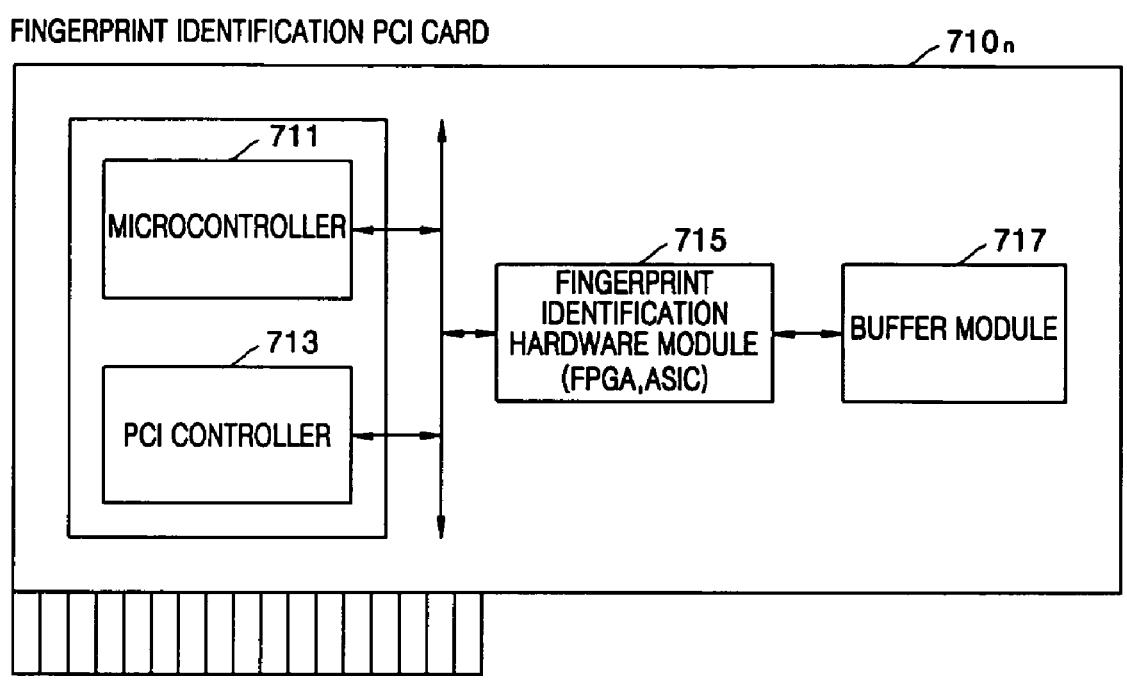
FIG. 7B is a diagram of a fingerprint identification peripheral component interconnection (PCI) card, according to an embodiment of the present invention.
Figure 8:
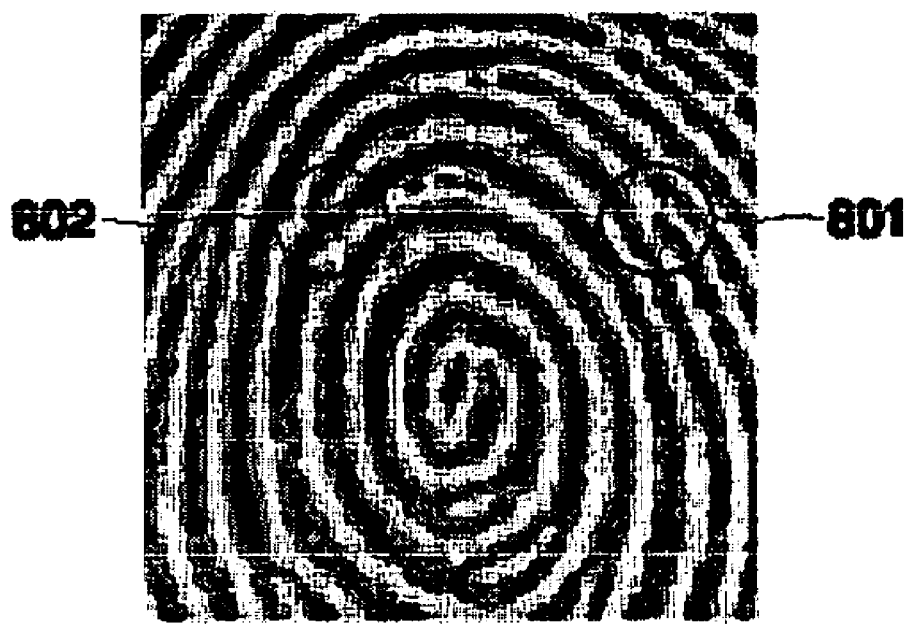
FIG. 8 illustrates examples of a fingerprint image and minutiae points extracted from the fingerprint image.
Figure 8:
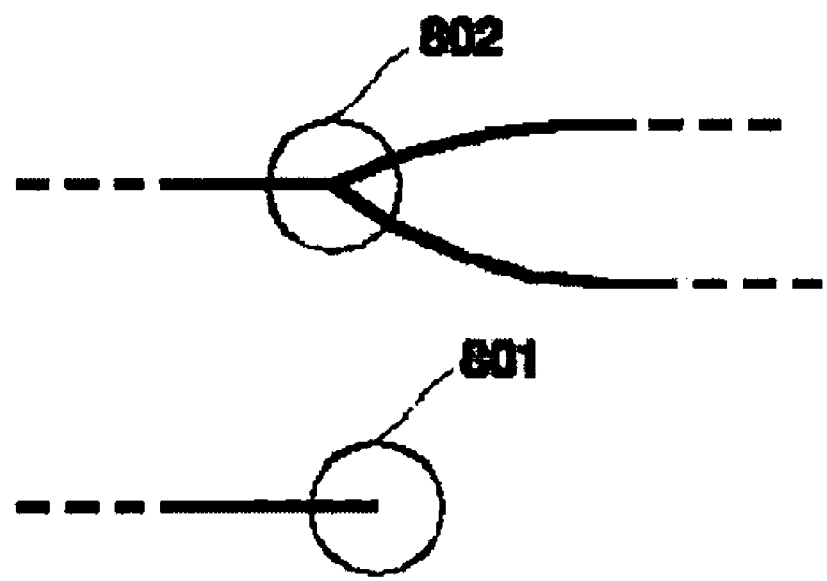

A structure of a PCI card 710$_n$ will now be described with reference to FIG. 7B. The PCI card 710$_n$ includes a fingerprint identification hardware module 715, a buffer module 717, a microcontroller 711, and a PCI controller 713. The hardware module 715 performs fingerprint matching. As described above, the buffer module 717 stores user tables downloaded from the database 730. The microcontroller 711 creates candidate lists of the user tables stored in the buffer module 717 (step 160). In general, a PCI interface is performed by the PCI controller 713, but may be performed by the microcontroller 713 when the PCI controller 713 is not included in the PCI card 710$_n$.

The present invention can be embodied as computer readable code on a computer readable medium. The computer readable medium is any data storage device that can store data that can thereafter be read by a computer system. Examples of the computer readable medium include read-only memory, random-access memory, CD-ROMs, magnetic tape, optical data storage devices. The computer readable medium can also be distributed over a network coupled computer system so that the computer readable code is stored and executed in a distributed fashion. A font ROM data structure according to the present invention may be stored as a computer readable code in a computer readable recording medium such as a ROM, a RAM, a CD-ROM, a magnetic tape, a hard disc, a floppy disk, a flash memory, or an optical data storage medium.

As described above, according to the present invention, it is possible to enroll a large amount of information regarding fingerprints in a database using quantization and geometric hashing while using a limited storage memory of a central database. Further, it is possible to accurately identify and detect a user's fingerprint in real time using geometric hashing and parallel processing.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of identifying a fingerprint using minutiae points of the fingerprint, the method comprising:
   (a) enrolling a fingerprint of a first user in a first database by extracting n minutiae points from a fingerprint image of the first user; selecting one of the n minutiae points as a reference point; rotating the other minutiae points by a predetermined angle with respect to the reference point; generating a first user table containing information regarding the first user's fingerprint based on geometrical changes of the other minutiae points which are obtained by the rotation; and storing the first user table in the first database; and
   (b) identifying a fingerprint of a second user by extracting m minutiae points from a fingerprint image of the second user; selecting one of the m minutiae points as a reference point; generating a second user table containing information regarding the second user's fingerprint based on geometric changes of the other minutiae points obtained by rotating the other minutiae points by an angle about the reference point; comparing the second user table with the first user table, and selecting a similar candidate list of user tables, wherein m and n are integers.

2. The method of claim 1, wherein the first and second user tables specify types of the minutiae points, and geometric changes in locations and angles of the other minutiae points with respect to location and angle of the selected minutiae point.

3. The method of claim 1, wherein (a) comprises:
   (a1) selecting a first reference plane using one of the minutiae points as an origin;
   (a2) generating the first user table by obtaining minutiae point information specifying locations, directions, and types of the other minutiae points in the first reference plane; and
   (a3) performing (a1) and (a2) on each of the remaining minutiae points.

4. The method of claim 3, wherein (a) further comprises:
   (a4) selecting two of the minutiae points and selecting a second reference plane with an origin centered between the selected two minutiae points, and a reference axis along a line connecting the selected two points;
   (a5) obtaining minutiae point information specifying locations, directions, and types of the remaining minutiae points from the second reference plane, and creating the first user table based on the obtained minutiae point information; and
   (a6) performing (a4) and (a5) on each of the remaining minutiae points.

5. The method of claim 4, wherein (a4) further comprises selecting two of the minutiae points and selecting the second reference plane using a distance between the selected two minutiae points as a unit distance.

6. The method of claim 3 or 4, wherein the minutiae point information is obtained by measuring the locations and directions of the other minutiae points with respect to the origin of the first or second reference plane and quantizing a result of measurement at predetermined intervals.

7. The method of claim 4, wherein (b) comprises:
   (b1) selecting a third reference plane using one of the minutiae points as an origin;
   (b2) obtaining minutiae point information specifying locations, directions, and types of the remaining minutiae points in the third reference plane and generating the second user table based on the obtained minutiae point information; and
   (b3) performing (b1) and (b2) on each of the remaining minutiae points.

8. The method of claim 7, wherein (b) further comprises:
   (b4) selecting two of the minutiae points and selecting a fourth reference plane with an origin centered between the selected two minutiae points, and a reference axis along a line connecting the selected two points;

(b5) obtaining minutiae point information specifying locations, directions, and types of the remaining minutiae points from the fourth reference plane and creating the second user table based on the obtained minutiae point information; and (b6) performing (b4) and (b5) on each of the remaining minutiae points.

9. The method of claim 8, wherein (b4) further comprises selecting two of the minutiae points and selecting the fourth reference plane using a distance between the selected two minutiae points as a unit distance.

10. The method of claim 7 or 8, wherein the minutiae point information is obtained by measuring the locations and directions of the other minutiae points with respect to the origin of the third or fourth reference plane and quantizing a result of measurement at predetermined intervals.

11. The method of claim 8, wherein (b) comprises:

(b1) forming at least one circle each with a different radii, centered at the origin of one of the third and fourth reference planes, setting locational and angular ranges of allowable errors, applying weights to each of the at least one circle, and applying the locational ranges of allowable errors to the respective minutiae points; and (b2) applying the angular ranges of allowable errors to the respective minutiae points while applying weights to the minutiae points according to a quantization size.

12. The method of claim 1, wherein (b) further comprises:

(b3) distributing a predetermined number of the first user tables stored in the first database corresponding to a predetermined number of users and storing the distributed first user tables in at least one distributed storage medium;

(b4) comparing the information regarding the second user's fingerprint with the distributed first user tables stored in the storage medium to determine similarities between the information regarding the second user's fingerprint with the first user tables and selecting a predetermined number of candidates based on the similarities; and (b5) selecting a predetermined number of candidates from the candidates selected in (4) in order of similarity.

13. An apparatus for identifying a fingerprint using minutiae points of the fingerprint, comprising:

a first information extracting unit which receives information regarding a first user's fingerprint that is to be enrolled in a database, extracts n minutiae points from the first user's fingerprint, sets one of the n minutiae points as a reference point, creates a first user table based on geometric characterizations of the other minutiae points, and outputs the first user table;

a second information extracting unit which receives information regarding a second user's fingerprint that is to be identified, extracts m minutiae points from the second user's fingerprint, sets one of the m minutiae points as a reference point, creates a second user table based on geometric characterizations of the other minutiae points, and outputs the second user table;

he database which stores the first user table; and a matching unit which compares the first user table with the second user table to determine similarities therebetween and determines whether the second user's fingerprint can be identified based on the similarities, wherein m and n are integers.

14. The apparatus of claim 13, wherein the matching unit comprises at least one buffer unit in which the first user table is stored when driving the apparatus, the buffer distributing the information regarding the first user's fingerprint into predetermined parts and individually stores the distributed information.

15. The apparatus of claim 13, wherein one of the first and second information extracting units selects a first reference plane using one of the minutiae points as an origin, obtains minutiae point information specifying locations, directions, and types of the other minutiae points in the first reference plane, and creates the first or second user table based on the minutiae point information.

16. The apparatus of claim 13, wherein the first or second information extracting unit selects two of the minutiae points;

selects a second reference plane with an origin centered between the selected two minutiae points, and a reference axis along a line connecting the selected two minutiae points;

obtains minutiae point information specifying locations, directions, and types of the other minutiae points in the second reference plane; and creates the first or second user table based on the minutiae point information, wherein the distance between the two selected points is used as an actual distance or as a unit distance.

17. The apparatus of claim 15 or 16, wherein the minutiae point information is obtained by measuring the locations and directions of the other minutiae points with respect to the origin of the first or second reference plane and quantizing a result of measurement at predetermined intervals.

18. The apparatus of claim 14, wherein the matching unit forms at least one circle, each with a different radii, centered at the origins of one of the first and second reference plane, sets locational and angular ranges of allowable errors and applying weights to each of the at least one circle, applies the locational ranges of allowable errors to the respective minutiae points, applies the angular ranges of allowable errors to the minutiae points while applying weights to the minutiae points according to a quantization size, and determines similarities between the minutiae points based on the result of applying the location and angular ranges to the respective minutiae points.

19. A computer readable recording medium on which a program that executes a method of identifying a fingerprint is recorded in a computer, wherein the method comprises:

(a) enrolling a fingerprint of a first user in a first database by extracting n minutiae points from a fingerprint image of the first user; selecting one of the n minutiae points as a reference point;

rotating the other minutiae points by a predetermined angle with respect to the reference point; generating a first user table containing information regarding the first user's fingerprint based on geometrical changes of the other minutiae points which are obtained by the rotation; and storing the first user table in the first database; and (b) identifying a fingerprint of a second user by extracting m minutiae points from a fingerprint image of the second user; selecting one of the m minutiae points as a reference point;

generating a second user table containing information regarding the second user's fingerprint based on geometric changes of the other minutiae points obtained by rotating the other minutiae points by an angle about the reference point;

comparing the second user table with the first user table, and selecting a similar candidate list of user tables, wherein m and n are integers.

* * * * *